3,200,512
APPARATUS FOR GAS-JET PROPELLING AND HEATING GRANULAR MATERIAL

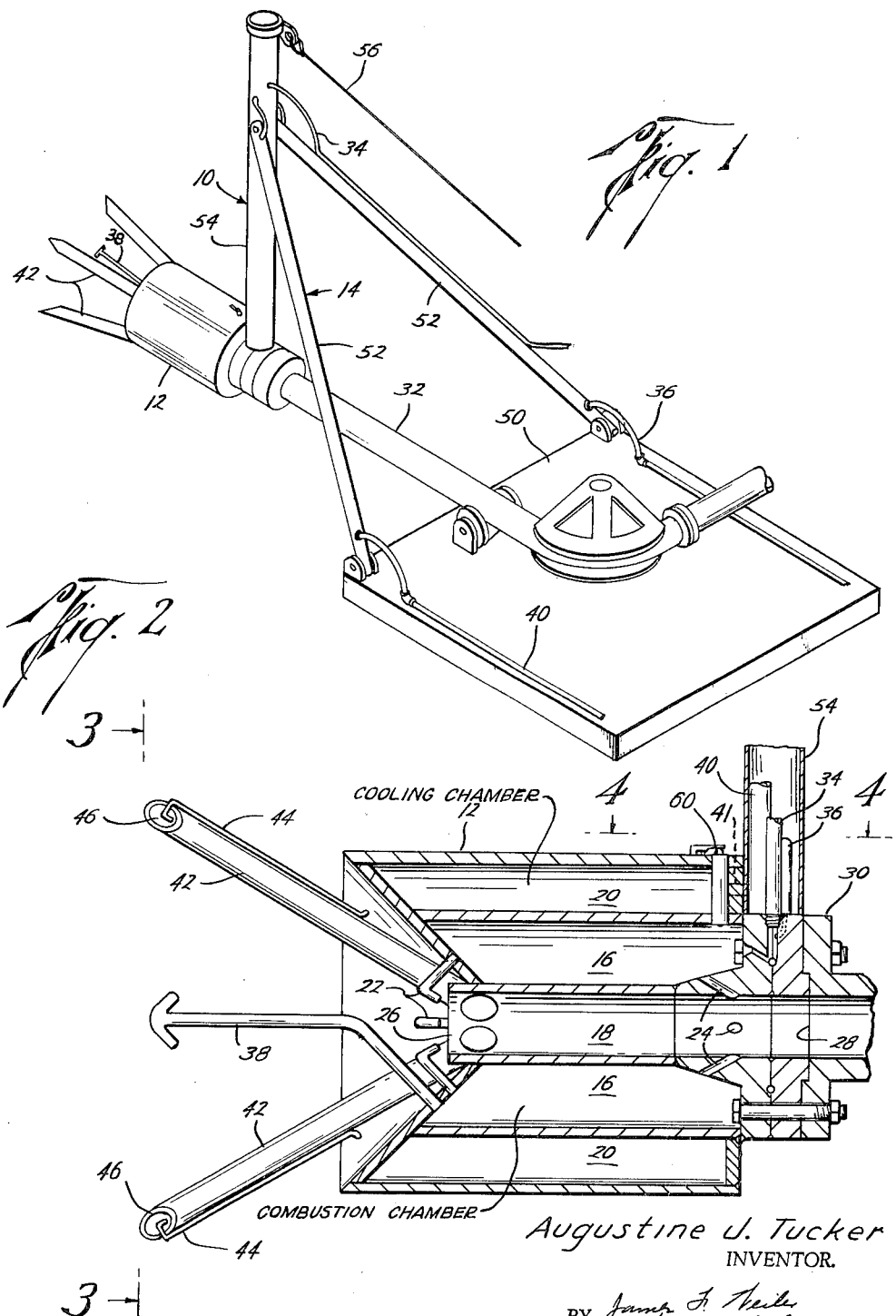

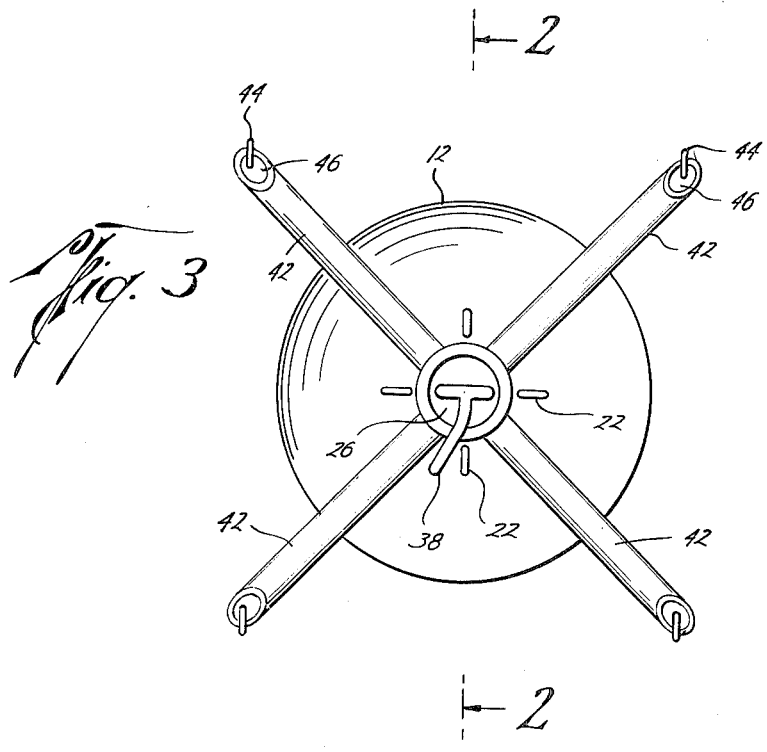
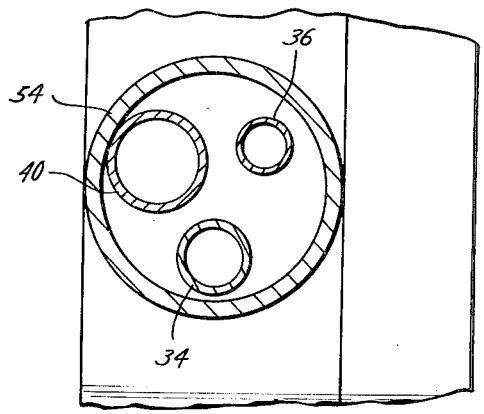

Augustine J. Tucker, 3115 Buffalo Drive, Houston, Tex.
Filed Jan. 5, 1962, Ser. No. 164,580
4 Claims. (Cl. 34—57)

The present invention relates to a material handling apparatus, and more particularly, relates to a material handling apparatus used to move bulk granular material from its natural location or from a location where it has been accumulated and to a location where it is desired to be moved.

The idea of moving granular material through a pipeline or conduit by suspension in a high velocity gas stream is generally old. However, it has been noted that in providing the high velocity gas to move the material that the common gas equipment used, where energy of a fuel is burned to provide the prime mover power, results in approximately one-third thermal losses, one-third mechanical losses, and provides only one-third useful work or efficiency. Additionally, in attempting to mine or move accumulations of bulk granular material it has been found that these materials are wet or damp which increases their weight and thereby increases the power required to move them and thus reduces the efficiency of the system. The present invention is directed to an improvement in a material handling device which will move granular material through the pipeline by suspension in a high velocity gas stream and yet will provide an increased efficiency apparatus which will move the material and at the same time heat the material to improve its ease of transportation.

It is therefore a general object of the present invention to provide a material handling apparatus which utilizes the exhaust directly from a combustion chamber to provide a high velocity gas stream necessary to move the granular material through the pipeline or conduit.

A still further object of the present invention is to provide a material handling apparatus in which the fuel is burned in a closed and pressurized combustion chamber and a plurality of jets are connected between the combustion chamber and directed into a conduit so as to move the material along the conduit.

Yet a still further object of the present invention is the provision of a material handling apparatus which utilizes a combustion chamber to directly provide a high velocity gas for moving granular material through a pipeline and at the same time utilizes the temperature of the combustion chamber to heat and dry any damp or wet granular material which is to be moved.

Yet a still further object of the present invention is the provision of a material handling apparatus in which a fuel is burned in a closed combustion chamber and provided with outlet jets for moving granular material along a pipe conduit and which is provided with a cooling jacket which provides the necessary cooling for the combustion chamber and which is directed into the material pipeline to aid in the movement of the material as well as cooling said pipeline.

Other and further objects, features and advantages will be apparent from the following description of a presently preferred embodiment of the invention, given for the purpose of disclosure and taken in conjunction with the accompanying drawings, where like character references designate like parts throughout the several views, and where, FIGURE 1 is a perspective view illustrating the material handling apparatus of the present invention, FIGURE 2 is a fragmentary cross-sectional view of the apparatus of the present invention, FIGURE 3 is a cross-sectional view taken along the line 3—3 of FIGURE 2, and FIGURE 4 is a fragmentary cross-sectional view taken along the line 4—4 of FIGURE 2.

Referring now to the drawings, and particularly to FIGURES 1 and 2, the present invention is generally designated by the reference numeral 10 and includes a housing 12. The housing 12 is suitably supported adjacent the material to be moved (not shown) by a suitable supporting structure 14 and the housing generally includes a combustion chamber 16, a material conduit or passageway 18, and a cooling jacket 20. A plurality of jets 22 and 24 are provided in the housing 12 and are connected between the combustion chamber 16 and the material conduit 18 for moving granular material along the conduit.

Referring now to FIGURE 2, a material passageway or conduit 18 is provided with an inlet 26 through which the granular material is fed and an outlet 28 for passing the granular material to a desired location. A suitable coupling flange 30 and rubber hose 32 (FIGURE 1) may be suitably connected to the conduit outlet 28 to transport the material to the desired location. In order to provide the high velocity gas stream necessary to move the granular material through the passageway or conduit 18, a combustion chamber 16 is provided wherein a fuel is burned under pressure to generate a sufficient pressure and volume of gas to move the material. It is to be noted that the gas pressure from the combustion chamber 16 is directly used to provide the motive force for moving the granular material instead of using it to drive a conventional motor and pump with the consequent inefficiency. Thus, this device provides a low cost compressed gas for moving the material where the purity of the gas is not of consequence. For example, low cost natural gas may be mixed with air and ignited in the combustion chamber 16 to provide the desired gas pressures. In that event, suitable feeder lines 34 and 36 (FIGURES 2 and 4) are provided which are in fluid communication with the combustion chamber 16 and which may carry the desired ratios of combustion air and combustion gas, respectively. Of course, if a solid type fuel is used, the feed lines will then be omitted.

A suitable conventional igniter 60 is provided supported by the housing 12 and extending from the housing exterior to the combustion chamber 16. Thus the fuel in the combustion chamber 16 may be ignited when desired.

A plurality of jets 22 and 24 are provided which are connected from the combustion chamber 16 to the material conduit 18. These jets direct the gases resulting from the combustion to the material conduit 18. As noted, the exterior jets 22 are positioned to direct the flow of high velocity gases into the inlet 26 of the conduit 18. These jets not only act to transport the material through the conduit 18 and pipeline 32, but serve to feed the material which is adjacent the inlet 26 into the conduit 18. The internal jets 24 are downstream jets which aid in propelling the material along the conduit 18 and pipeline 32.

An additional, preferably T-headed jet 38 (FIGURES 2 and 3) may be provided which is connected to the combustion chamber 16 and positioned so as to discharge hot gases into the material to be moved thereby heating and drying this material. The heating and drying makes the material lighter and easier to move in a pipeline and thereby results in an increased efficiency of the system.

In some locations, it may be desirable to provide a cooling jacket to cool both the combustion chamber 16 and the material passageway or conduit 18. Thus, a cooling jacket 20 may be provided which may receive compressed air through a suitable air line 40 through a suitable passageway 41. When the compressed air flows through the jacket 20, the jacket will maintain the combustion chamber and the other part of the housing 12 at the desired operating temperature. While the air from the cooling jacket may be vented directly into the conduit passageway 18, it is one feature of the present invention to utilize this compressed air to aid in feeding the material to the conduit 18. Thus, a plurality of feeder conduits 42 (FIGURE 2 and 3) are provided which are connected to the conduit 18. Suitable air jets 44 are provided to jet air from the cooling jacket 20 into the inlet ends 46 of the material lines 42. Thus, when the housing 12 is placed into a material to be moved, which is preferably fed by gravity to the conduit inlet 26, the air jets 44 will feed material into the conduit 18 through the feeder conduits 42 as well as cooling the material conduit 18.

Any suitable support structure 14 may be utilized such as placing the housing 12 directly on a suitable crane. The support 14 is merely used to insert the housing 12 into the material desired to be mined or moved and thus a platform 50 may be provided having struts 52 which pivotally support a boom 54. A suitable cable 56 may be actuated to move the housing into the material being moved. Additionally, the support 14 may be used to carry the fuel and compressed air lines 34, 36 and 40.

In use, and referring to FIGURES 1 and 2, the support 14 is placed adjacent the material to be moved and the proper ratio of gas and combustion air are fed under pressure through the lines 34 and 36, respectively, to the combustion chamber 16. The igniter 60 is actuated to start the pressurized combustion so as to produce a high velocity exhaust gas through the jets 22 and 24. While any type of fuel may be used and of course the pressures and temperatures desired would depend upon the material being moved, a pressure of about 100 p.s.i. at a temperature of 1500 to 2000° F. for moving granular sand is satisfactory and can be provided from a fuel of natural gas and air. It is to be noted that since the exhaust gases from the combustion chamber are fed directly to the jets 22 and 24 into the material conduit 18 that the energy losses are at a minimum. The housing 12 is then fed into the material to be moved and positioned preferably to obtain a gravity feed of the material into the open front of the housing 12 adjacent the inlet 26 of the material conduit 18. When the material is positioned adjacent the inlet 26 the outer jets 22 act upon the material to push it into the conduit 18 and suspend it in a high velocity gas stream for passage through the conduit 18 and a suitable pipeline such as the rubber hose 32 (FIGURE 1). The additional jets 24 downstream from the inlet 26 provide additional boosting action on the material. In addition, in many locations the granular material will be wet or damp and the T-head jet 38 may be provided which is connected to the combustion chamber 16 and is positioned in front of the housing 12 so as to be discharged into the material. The exhaust from jet 38 heats and dries the material thereby preventing it from being congealed or otherwise stuck together and makes the granular material easier and lighter to move in the conduit 18. The cooling jacket 20 may be provided to provide cooling for the combustion chamber 16 and also may be directed into the material conduit 18 to provide cooling of that conduit and the materials passing therethrough.

In order to utilize the cooling gas in the cooling jacket 20 for feeding the material into the conduit 18, a plurality of feeder conduits 44 are provided which have one end connected to the conduit 18. A jet 44 is connected to the second ends 46 of the feeder conduits 42 and to the gas in the cooling jacket 20. Thus, when the housing 12 and thus the feeder conduits 42 are placed into the material being moved, the passage of gas from jacket 20 to the jets 44 will aid in feeding material to conduit 18. And it is to be noted that all of the jets 22, 24 and 44 are directed to move the material along the material conduit 18 toward outlet 28 and thereby create a suction effect which aids in feeding the material into the apparatus.

Thus, a simple and low cost apparatus is provided which provides low cost compressed gases for moving granular material through a line by suspension in a high velocity air stream.

The present invention, therefore, is well adapted to carry out the objects and attain the ends and advantages mentioned as well as others inherent therein. While a presently preferred embodiment of the invention is given for the purpose of disclosure, numerous changes in details of construction and arrangement of parts may be made which will readily suggest themselves to those skilled in the art and which are encompassed within the spirit of the invention and the scope of the appended claims.

What is claimed is:

1. An apparatus for moving granular material comprising,
    (a) a material passageway having an inlet and outlet,
    (b) a combustion chamber surrounding said material passageway,
    (c) a plurality of jets connected between said combustion chamber and the passageway,
    (d) said jets directed toward the outlet of said passageway thereby moving material in said passageway through said passageway,
    (e) a cooling jacket surrounding said combustion chamber,
    (f) cooling passageways connecting said cooling jacket and the material passageway.

2. The invention of claim 1 including at least one jet connected to said combustion chamber and positioned to be discharged into said material to be moved thereby heating and drying the material.

3. An apparatus for moving granular materials comprising,
    (a) a material passageway having an inlet and an outlet,
    (b) a gas combustion chamber surrounding said material passageway,
    (c) a plurality of jets connected between said combustion chamber and the passageway,
    (d) said jets directed toward the outlet of said passageway thereby moving material in said passageway through said passageway,
    (e) a gas cooling jacket surrounding said combustion chamber,
    (f) a plurality of feeder conduits, each having an inlet and an outlet,
    (g) the feeder conduit outlets being connected to said material passageway,
    (h) the feeder conduit inlets being positioned to contact the granular material,
    (i) a jet connected between the cooling jacket and each of the feeder conduits for moving material along the feeder conduits to the passageway and cooling the material passageway, and
    (j) support means connected to and supporting said apparatus for movement toward the granular material.

4. The invention of claim 3 including at least one jet connected to said combustion chamber and positioned to be discharged into said material to be moved thereby heating and drying said material.

(References on following page)

References Cited by the Examiner

UNITED STATES PATENTS

| | | | |
|---|---|---|---|
| 1,639,967 | 8/27 | Reader | 34—57 |
| 2,441,613 | 5/48 | Balassa | 34—57 X |
| 2,607,666 | 8/52 | Martin. | |
| 2,666,269 | 1/54 | Parry | 34—10 |
| 2,689,973 | 9/54 | Lee et al. | 34—10 |

FOREIGN PATENTS 732,639   6/55   Great Britain.

OTHER REFERENCES

Unit Drys and Sizes Limestone, in Rock Products, page 91, February 1950.

NORMAN YUDKOFF, *Primary Examiner.*

CHARLES O'CONNELL, *Examiner.*